W. M. Waggoner.
Grain Binder.

Nº 22682      Patented Jan. 18, 1859.

Witnesses
Frederick Hoven
M. M. Murphey

Inventor
W. M. Waggoner

UNITED STATES PATENT OFFICE.

W. M. WAGGONER, OF MIDDLETOWN, INDIANA.

IMPROVEMENT IN DEVICES FOR GATHERING GRAIN INTO GAVELS.

Specification forming part of Letters Patent No. 22,682, dated January 18, 1859.

*To all whom it may concern:*

Be it known that I, W. M. WAGGONER, of Middletown, in the county of Henry and State of Indiana, have invented a new and Improved Device for Gathering Cut Grain into Gavels for Binding; and I do hereby declare that the following is a full, clear, and exact description of the same, reference being had to the annexed drawings, making a part of this specification, in which—

Figure 1:
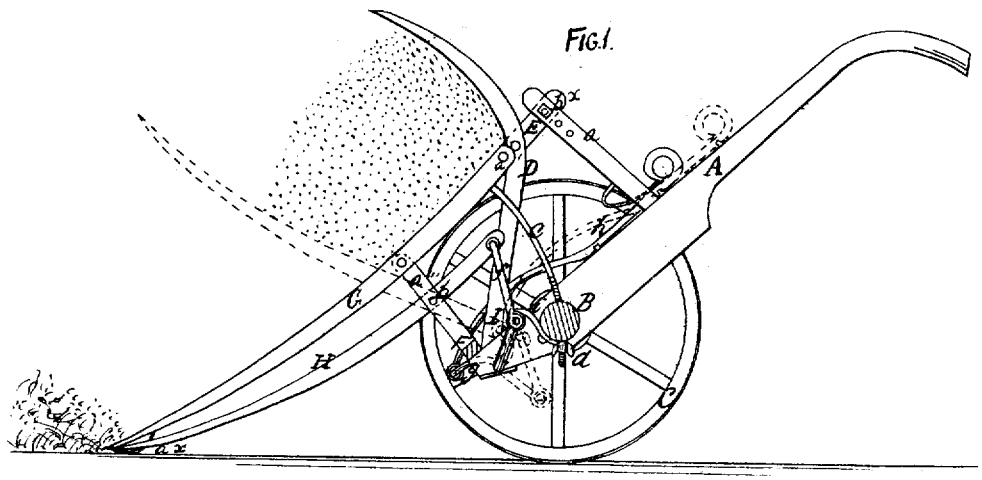
Figure 2:
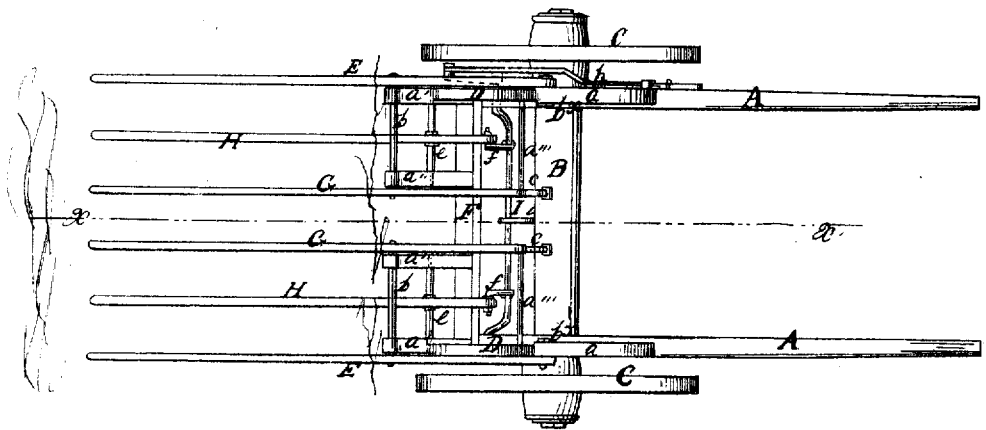

Figure 1 is a longitudinal vertical section of my invention, taken in the line $x\ x$, Fig. 2. Fig. 2 is a plan or top view of the same.

Similar letters of reference indicate corresponding parts in the two figures.

This invention consists in having stationary and adjustable fingers attached to a framework mounted on wheels and provided with handles, the parts being so arranged, as hereinafter fully shown and described, that an operator may shove the device along and underneath a windrow of grain and gather the same into gavels, and bind each gavel into a sheaf, the work being formed with great facility and very expeditiously.

To enable those skilled in the art to fully understand and construct my invention, I will proceed to describe it.

A A represent two handles, formed of wooden bars, curved at their outer ends similar to plow-handles. Through the lower or inner ends of these handles an axle, B, passes, having a traction-wheel, C, at each end. To each handle A, at their lower or inner parts, two stanchions, $a\ a'$, are attached at right angles, and to the inner end of each handle a curved bar, D, is attached, the form of which is shown plainly in Fig. 1. To the upper end of each stanchion $a$ the back end of a finger, E, is attached. These fingers are of curved form, and taper gradually from their back to their front ends. The lower parts of the stanchions $a'$ are connected by a traverse-bar, F, and to this bar two stanchions, $a''\ a''$, are attached at right angles.

To the upper part of each stanchion $a''$ a curved finger, G, is attached, and the back ends of these fingers are also attached to the fingers E by rods $a'''$. The fingers G are attached to the stanchions $a''$ by rods $b$, which pass through said stanchions, and also through the upper parts of the stanchions $a'\ a'$ and the fingers E E. (See Fig. 2.) Through the axle B two curved rods, $c\ c$, pass, the lower ends of said rods having screw-threads formed on them, and provided with nuts $d$. The upper ends of these rods are attached to the back ends of the fingers G G.

Between the stanchions $a'\ a''$ rods or shafts $e$ are placed, and on each rod or shaft a finger, H, is placed, said fingers being allowed to rise and fall, or work on their rods or shafts $e$. The back ends of the fingers H are connected by links $f$ to a crank-shaft, I, which passes through the inner parts of the handles A A, and has a crank, $g$, at one end, said crank having an arm, $h$, attached to it, which arm is fitted in guides attached to one of the handles A.

To the axle B, at about its center, a curved rod or bar, $i$, is attached, which rod or bar serves as a stop to the crank-shaft I. (See more particularly Fig. 1.) To the outer end of the fingers E shoes $a^\times$ are attached, one to each. (See Fig. 1.)

The operation is as follows: The operator grasps the handles A A and shoves the device along, the fingers E G H passing underneath the windrow and gathering up the grain, the device being sufficiently wide to extend across the windrow. When a sufficient quantity of grain is collected on the fingers, the operator stops and draws outward the arm $h$, which thereby actuates the crank-shaft I, and in consequence of the fingers H H being connected to said shaft by the links $f\ f$, the fingers H will be quickly raised to the position shown in Fig. 1, and the grain on the fingers will be gathered in a compact form between the fingers H and the curved bars D D.

When the grain is thus gathered, the operator releases the handles A A, and the weight of the gavel between the fingers H and the bars D will cause the outer ends of the handles A to fall to the ground. The operator then passes the band around the gavel, between the fingers G G, secures the ends of the band together, and the sheaf is thrown from the device. The fingers H H are then, by actuating the arm $h$, depressed to their original position, the handles A raised by the operator, who again shoves the device forward to gather a succeeding gavel.

I would remark that the fingers G G may be adjusted higher or lower, as the operator may desire, by turning the nuts $d$, and the fingers E E may be adjusted by moving the bolt $b^\times$, which connects the back ends of the fingers E to the stanchions $a$. I would also remark that the bar $h$ is retained in position at either adjustment by pins $c^\times c^\times$, attached to the handles, and which fit in notches in the bar.

By this invention grain may be readily collected into gavels and bound, the work being done with far greater facility than it can be done by the old practice of raking it into gavels by hand.

Having thus described my invention, what I claim as new, and desire to secure by Letters Patent, is—

The stationary fingers E E G G and the fly or gathering fingers H H, attached to a suitable framing or stanchions, mounted on wheels and arranged to operate substantially as and for the purpose set forth.

W. M. WAGGONER.

Witnesses:
 FRED. HOOVER,
 M. M. MURPHEY.